US012138498B2

(12) United States Patent
Zheng et al.

(10) Patent No.: US 12,138,498 B2
(45) Date of Patent: Nov. 12, 2024

(54) MULTI-MODE STARTING DRY POWDER FIRE EXTINGUISHING BALL

(71) Applicant: HUNAN ANMIN SCIENCE AND TECHNOLOGY CO., LTD., Hunan (CN)

(72) Inventors: Yonghua Zheng, Hunan (CN); Cuifang Chen, Hunan (CN); Yong Li, Hunan (CN); Bin Huang, Hunan (CN)

(73) Assignee: HUNAN ANMIN SCIENCE AND TECHNOLOGY CO., LTD., Yongzhou (CN)

(*) Notice: Subject to any disclaimer, the term of this patent is extended or adjusted under 35 U.S.C. 154(b) by 717 days.

(21) Appl. No.: 17/414,947

(22) PCT Filed: Nov. 25, 2019

(86) PCT No.: PCT/CN2019/120628
§ 371 (c)(1),
(2) Date: Jun. 16, 2021

(87) PCT Pub. No.: WO2020/108434
PCT Pub. Date: Jun. 4, 2020

(65) Prior Publication Data
US 2022/0080240 A1 Mar. 17, 2022

(30) Foreign Application Priority Data
Nov. 27, 2018 (CN) ........................ 201821970310.6

(51) Int. Cl.
*A62C 35/08* (2006.01)

(52) U.S. Cl.
CPC .................................. *A62C 35/08* (2013.01)

(58) Field of Classification Search
CPC ......... A62C 19/00; A62C 3/025; A62C 37/40; A62C 37/12; A62C 35/08; A62C 35/02; A62C 37/14; A62C 8/005; A62C 13/02
See application file for complete search history.

(56) References Cited

U.S. PATENT DOCUMENTS 4,964,469 A * 10/1990 Smith .................... A62C 19/00 169/53
2003/0006046 A1 1/2003 Kaimart
(Continued)

FOREIGN PATENT DOCUMENTS

CN 1713935 A 12/2005
CN 200998548 * 1/2008 ............. A62C 35/08
(Continued)

OTHER PUBLICATIONS

International Search Report of PCT/CN2019/120628.
Written Opinion of PCT/CN2019/120628.

*Primary Examiner* — Christopher R Dandridge

(57) ABSTRACT

The present invention relates to the technical field of fire extinguishing equipment, and in particular, relates to a multi-mode starting dry powder fire extinguishing ball for fire alarm and automatic starting of a fire extinguishing device, comprising a ball body. A fire extinguishing medium is provided in the ball body; the ball body is also provided with a driving device for enabling the inside of the ball body to expand to the explosion thereof after being started; the driving device is provided with a first lead which extends to the outside of the ball body and can enable the driving device to start after being heated; the driving device is also provided with a second lead which extends to the outside of the ball body and can enable the driving device to start after being powered on.

5 Claims, 3 Drawing Sheets

(56) References Cited

U.S. PATENT DOCUMENTS

| | | | | |
|---|---|---|---|---|
| 2013/0092402 | A1 | 4/2013 | Al Thawad | |
| 2017/0059090 | A1* | 3/2017 | Bopp | F17C 7/00 |

FOREIGN PATENT DOCUMENTS

| | | | | | |
|---|---|---|---|---|---|
| CN | 200998548 | Y | 1/2008 | | |
| WO | WO-2018143902 | A1 * | 8/2018 | | A62C 19/00 |

* cited by examiner

MULTI-MODE STARTING DRY POWDER FIRE EXTINGUISHING BALL

CROSS-REFERENCE

This Application is a national stage application of PCT PCT/CN2019/120628. This application claims priority from PCT/CN2019/120628 filed on Nov. 25, 2019 and Chinese Patent Application No. 201821970310.6, filed on Nov. 27, 2018, which are hereby incorporated by references.

DESCRIPTION OF RELATED ART

The present invention relates to the field of fire extinguishing equipment, and in particular, to a multi-mode starting dry powder fire extinguishing ball for fire alarm and automatic starting of a fire extinguishing device.

At present, the fire extinguishing ball is widely used in restaurants, hotels, factories, kitchens, power distribution cabinets and other places, the starting mode of the existing fire extinguishing ball is single, starting must be met by an open flame or reaching the starting temperature, at the early stage of the fire, if the open flame of fire place does not exactly hit the lead of the fire extinguishing ball, then the fire extinguishing ball cannot be started, thereby delaying the best time to extinguish fire. In addition, the existing fire extinguishing balls cannot be started simultaneously, for example, there are four fire extinguishing balls in a room, when a fire occurs, the fire extinguishing ball which is hit by open flame will start, but the fire extinguishing efficiency of individual fire extinguishing ball is limited, there is a possibility that the fire can not be completely extinguished, if multiple fire extinguishing balls are activated simultaneously, then the effect of fire extinguishing can be taked well and loss caused by fire can be reduced.

SUMMARY

In order to solve the problem that the fire extinguishing ball in prior art can only be started after the lead is burned, which leads to the problem that the starting and fire extinguishing is not timely, the present invention provides multi-mode dry powder fire extinguishing ball.

The present invention is realized by the following technical solution:

Multi-mode dry powder fire extinguishing ball, comprising a ball body, a fire extinguishing medium is provided in the ball body; the ball body is also provided with a driving device for enabling the inside of the ball body to expand to the explosion thereof after being started; the driving device is provided with a first lead which extends to the outside of the ball body and can enable the driving device to start after being heated; the driving device is also provided with a second lead which extends to the outside of the ball body and can enable the driving device to start after being powered on.

The multi-mode dry powder fire extinguishing ball as described above, the driving device includes initiator provided inside of the ball body, and one end of the first lead and the second lead are located in the initiator.

The multi-mode dry powder fire extinguishing ball as described above, the first lead is a heat lead.

The multi-mode dry powder fire extinguishing ball as described above, an end of the second lead located inside of the initiator is also connected with an electric match.

The multi-mode dry powder fire extinguishing ball as described above, the outer circumferential surface of the ball body is also provided with an annular groove on a plane passing through the center of the ball body, the leading end of the first lead is wound around the annular groove.

The multi-mode dry powder fire extinguishing ball as described above, the outer circumferential surface of the ball body is also provided with an annular groove on the horizontal plane passing through the center of the ball body and a vertical annular groove on the vertical plane passing through the center of the ball body, and two first leads are provided, which are wound around the annular groove and the vertical annular groove respectively.

The multi-mode dry powder fire extinguishing ball as described above, the ball body includes a ball body shell with an inner cavity, the ball body shell is provided with a notch, and the notch is provided with a plug for sealing the notch.

Compared with the prior art, advantage of the present invention is as follows:

1. The present invention provides multi-mode dry powder fire extinguishing ball, the starting mode can be started by the first lead (the first lead burns after the temperature reaching the ignition point ,so as to start the internal driving device), or by the second lead, the second lead is an electric lead, and the second lead is connected to an external circuit, sensors and the like, so that automatic starting of the fire extinguishing ball is realized; moreover, the multiple fire extinguishing balls can be started simultaneously, thereby realizing timely fire extinguishing, and reducing fire loss.

2. The multi-mode dry powder fire extinguishing ball of the present invention has a simple structure, can automatically start when the condition is met by connecting detection devices such as smoke and temperature sensors, can act on the fire scene timely, can realize remote control by the second lead and remote start by humans.

BRIEF DESCRIPTION OF THE DRAWINGS

In order to explain the technical solution more clearly in the embodiments of the present invention, the following will briefly introduce the drawings used in the description of the embodiments, obviously, the drawings in the following description are only showing the embodiments of the present invention, ordinary technicians in this field can obtain other drawings based on these drawings without creative efforts.

DETAILED DESCRIPTION OF SAMPLE EMBODIMENTS

In order to make the technical problems, technical solutions and beneficial effects solved by the present invention more clear, the following further describes the present invention in detail with reference to the accompanying drawings and embodiments. It should be understood that the specific embodiments described herein are only used to explain the present invention, and are not intended to limit the present invention.

Figure 1:
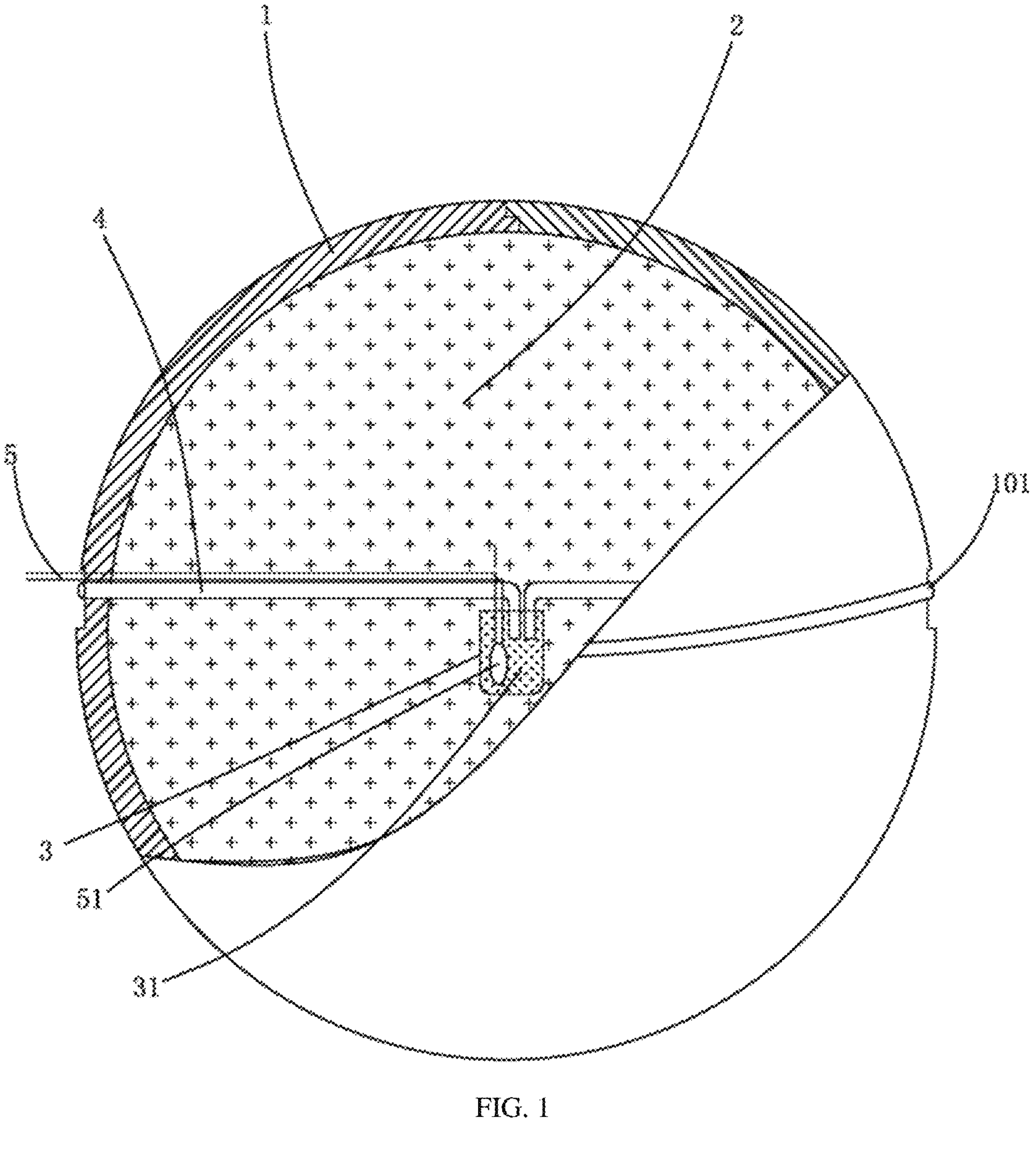
FIG. 1 is the structure schematic diagram of the multi-mode dry powder fire extinguishing ball of the present invention.
Figure 2:
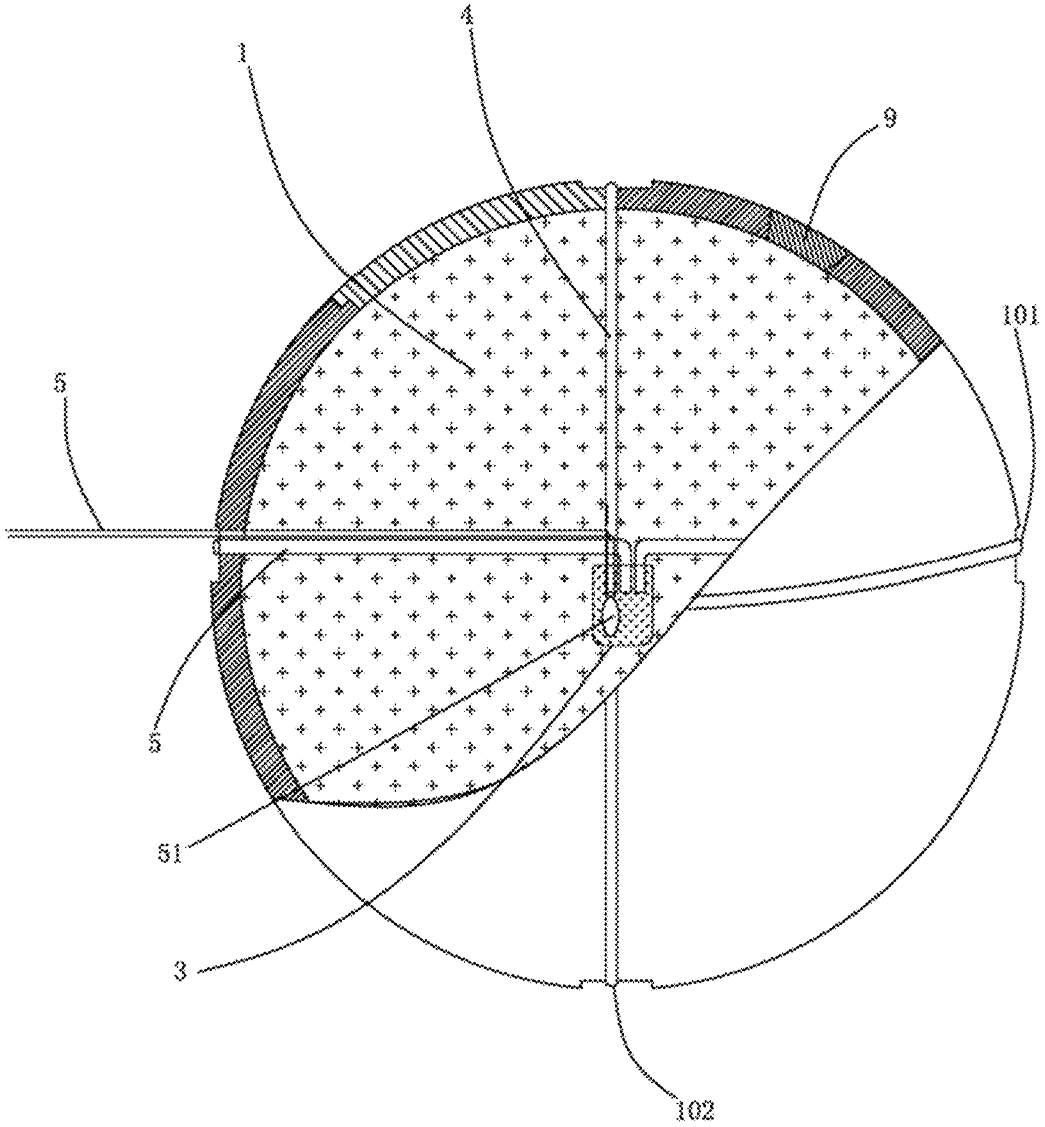
FIG. 2 is the half cross-sectional view of the multi-mode dry powder fire extinguishing ball.
Figure 3:
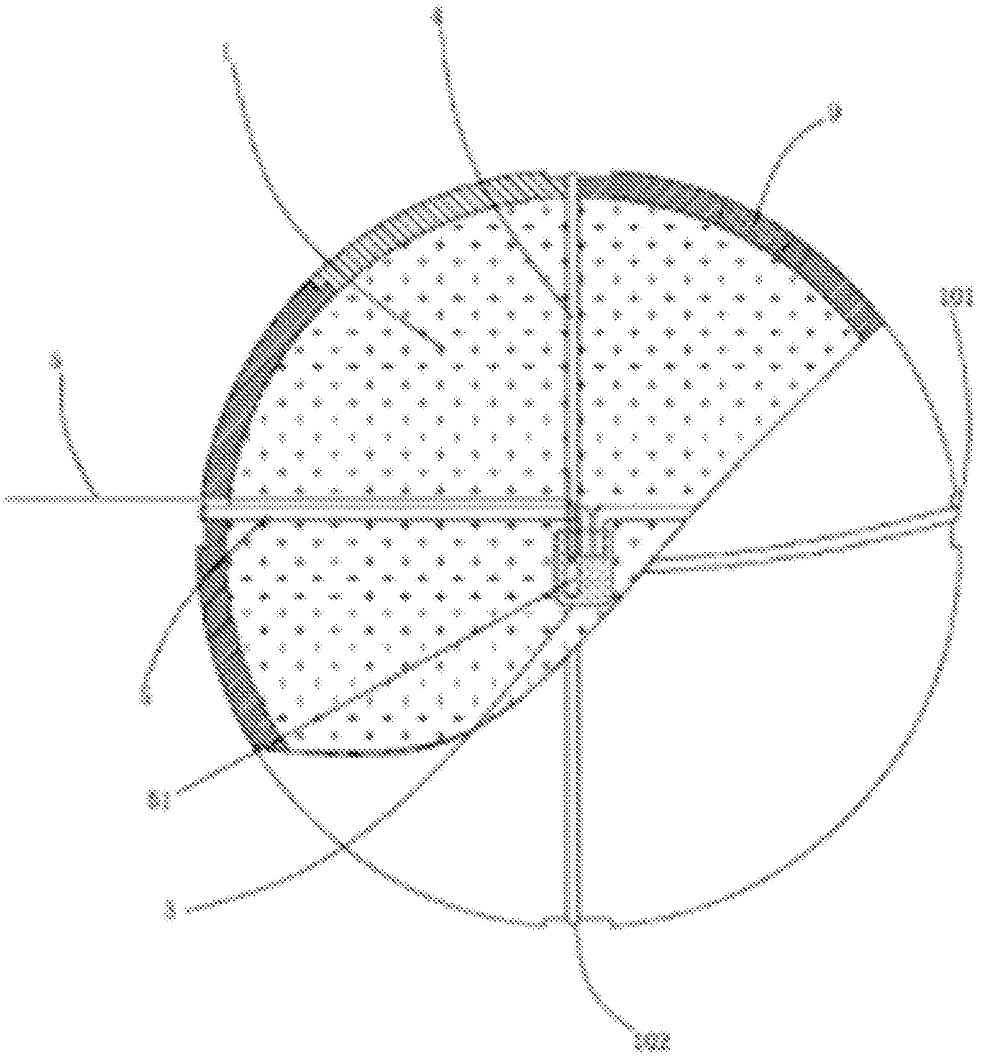

The present invention is realized by the following technical solution:

As shown in FIG. 1 and FIG. 2, the multi-mode dry powder fire extinguishing ball includes a ball body (1), a fire extinguishing medium (2) is provided in the ball body (1), the ball body (1) is also provided with a driving device (3)

for enabling the inside of the ball body (1) to expand to the explosion thereof after being started; the driving device (3) is provided with a first lead (4) which extends to the outside of the ball body (1) and can enable the driving device (3) to start after being heated; the driving device (3) is also provided with a second lead (5) which extends to the outside of the ball body (1) and can enable the driving device (3) to start after being powered on. The present invention provides multi-mode dry powder fire extinguishing ball, the starting mode can be started by the first lead (the first lead burns after the temperature reaching the ignition point ,so as to start the internal driving device), or by the second lead, the second lead is an electric lead, and the second lead is connected to an external circuit, sensors and the like, so that automatic starting of the fire extinguishing ball is realized; moreover, the multiple fire extinguishing balls can be started simultaneously, thereby realizing timely fire extinguishing, and reducing fire loss.

Specifically, can automatically start when the condition is met by connecting detection devices such as smoke and temperature sensors, can act on the fire scene timely, and can also be started by an external button. Moreover, multiple fire extinguishing balls can be connected in parallel with each other through the second lead, so as to realize remote control by humans.

In addition, the fire extinguishing medium (2) is a dry powder fire extinguishing agent, such as using sodium bicarbonate, potassium bicarbonate, ammonium hydrogen phosphate, ammonium dihydrogen phosphate, ammonium sulfate or ammonium polyphosphate and so on, with an average particle size of less than 20 microns, liquidity is required to meet the GA578-2005 standard.

Further, the driving device (3) includes initiator (31) provided in the ball body (1), and one end of the first lead (4) and the second lead (5) are located in the initiator (31). By the effect of the initiator (31), the interior is expanded to explode the ball body, so that the fire extinguishing medium (2) inside can be ejected outside, thereby realizing fire extinguishing. Specifically, the initiator may use potassium perchlorate and magnesium powder, which produce a large amount of high-pressure gas when being heated or exposing to an open flame.

Specifically, in the present solution, the first lead (4) is a heat lead. The heat lead is composed of three different cored leads covered with a layer of plastic, When the ambient temperature reaches the starting temperature of the heat lead or the heat lead is exposed to an open flame, the heat lead will burn rapidly. This makes the starting of the present invention be quick and reliable.

In addition, in the present solution, an end of the second lead (5) located inside of the initiator (31) is also connected with an electric match (51). After the second lead being powered on, the electric match can be heated or ignited, thereby taking an effect on starting. Using the simple structure increases the starting mode of the fire extinguishing ball, so that the fire extinguishing ball can be started manually and automatically, which can make it act on the fire scene timely, and can effectively reduce fire loss.

Further, in the first embodiment of the present solution, the outer circumferential surface of the ball body (1) is further provided with an annular groove (101) on a plane passing through the center of the ball body, the leading end of the first lead (4) is wound around the annular groove (101). When the fire burns to the first lead (4)on the outside, thereby making the first lead (4) be ignited, so that can start the internal starting device. Moreover, annular groove (101) is provided on the plane passing through the center of the ball body, so that can maximize the contact area. In the present solution, this setting is good for manual operation, that is the traditional method, throwing the fire extinguishing ball into the fire.

In addition, in the second embodiment of the present solution, the outer circumferential surface of the ball body (1) is also provided with an annular groove (101) on the horizontal plane passing through the center of the ball body and a vertical annular groove (102) on the vertical plane passing through the center of the ball body, and two first leads (4) are provided, which are wound around the annular groove (101) and the vertical annular groove (102) respectively. By the cross-type setting, the contact area of the first lead can be further increased, thereby realizing more efficient starting.

Further, the specific structure of the ball body is that the ball body (1) includes a ball body shell with an inner cavity, and the ball body shell is provided with a notch, and the notch is provided with a plug (9) for sealing the notch. The simple structure is convenient for the manufacture of fire extinguishing balls and the installation of fire extinguishing media.

The present invention provides multi-mode dry powder fire extinguishing ball, the starting mode can be started by the first lead (it burns after the temperature reaching the ignition point to start the internal driving device), or by the second lead, the second lead is an electric lead, and the second lead is connected to an external circuit, sensors and the like, so that automatic starting of the fire extinguishing ball is realized; moreover, the multiple fire extinguishing balls can be started simultaneously, thereby realizing timely fire extinguishing, and reducing fire loss.

As described above is one or more embodiments provided in combined with specific content, the specific implementation of the present invention is not limited to these description Any similarity or identity to the method and the structure of the present invention, or a number of technical deduction, or replacement made under the premise of the present conception should be regarded as the protection scope of the present invention.

What is claimed is:

1. A dry powder fire extinguishing ball, comprising a ball body (1), a first lead (4) and a second lead (5), a fire extinguishing medium (2) is provided in the ball body (1) and is a dry powder fire extinguishing agent, wherein the ball body (1) is also provided with an initiator (31) for enabling the inside of the ball body (1) to expand until it explodes after being started so that the fire extinguishing medium (2) inside is configured to be ejected outside; one end of each of the first lead (4) and the second lead (5) is located in the initiator (31), the one end of the second lead (5) located inside of the initiator (31) is also connected with an electric match (51) disposed inside the initiator (31); the other end of the first lead (4) extends to the outside of the ball body (1) and is configured to activate the initiator (31) when heated, the other end of the second lead (5) extends to the outside of the ball body (1) and is configured to enable the initiator (31) to start after being powered on; multi-mode activation of the dry powder fire extinguishing ball is achieved by activating the initiator (31) through either the first lead (4) or the second lead (5), wherein the initiator (31) is configured to utilize potassium perchlorate and magnesium powder to produce a large amount of high-pressure gas when being heated or exposing to an open flame.

2. The dry powder fire extinguishing ball according to claim 1, wherein the first lead (4) is a heat lead that is composed of three different cored leads covered with a layer of plastic, and when an ambient temperature reaches a starting temperature of the heat lead or the heat lead is exposed to the open flame, the heat lead will burn.

3. The dry powder fire-extinguishing ball according to claim 2, wherein an outer circumferential surface of the ball body (1) is also provided with an annular groove (101) on a plane passing through the center of the ball body, a leading end of the first lead (4) is wound around the annular groove (101).

4. The dry powder fire extinguishing ball according to claim 3, wherein an outer circumferential surface of the ball body (1) is also provided with an annular groove (101) on the horizontal plane passing through the center of the ball body and a vertical annular groove (102) on the vertical plane passing through the center of the ball body, the number of the first lead (4) is two, and two first lead (4) are wound around the annular groove (101) and the vertical annular groove (102) respectively.

5. The dry powder fire extinguishing ball according to claim 4, wherein the ball body (1) includes a ball body shell with an inner cavity, the ball body shell is provided with a notch, and the notch is provided with a plug (9) for sealing the notch.

* * * * *